Figure 1A:
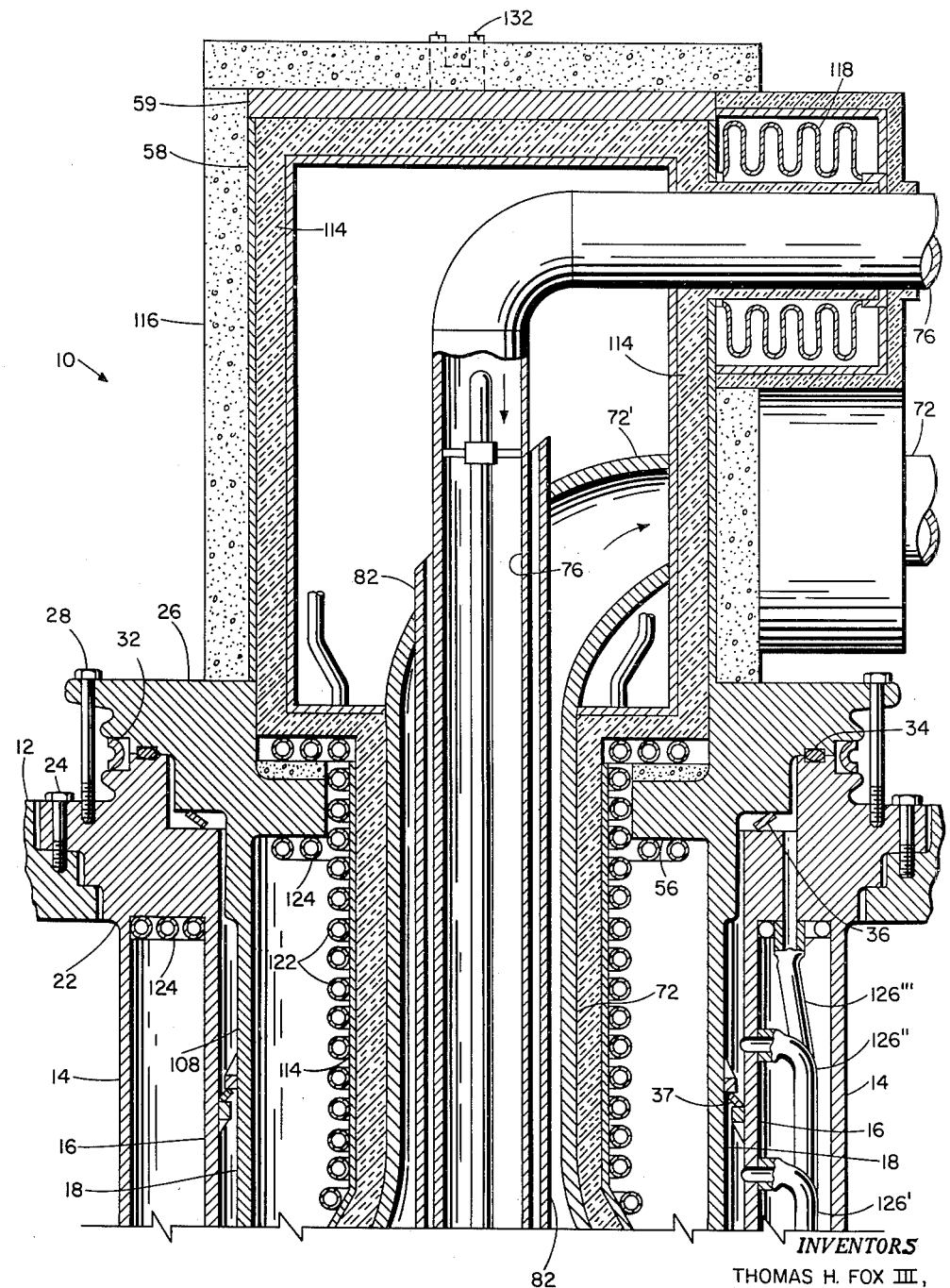

INVENTORS
THOMAS H. FOX III,
THOMAS RICHEY JR., &
GORDON R. WINDERS
BY

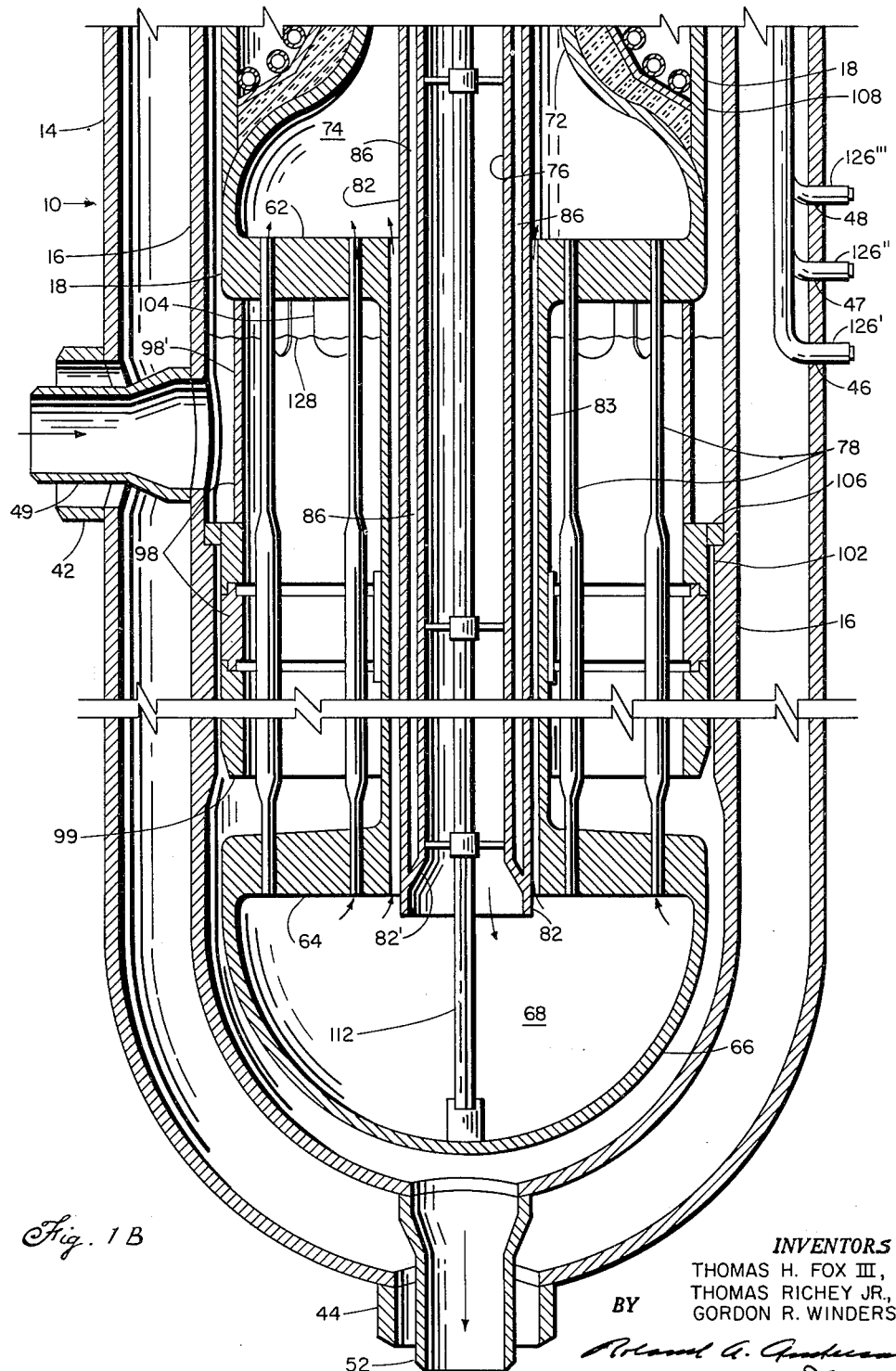

United States Patent Office 3,059,908
Patented Oct. 23, 1962

3,059,908
HEAT EXCHANGER
Thomas H. Fox III, Thomas Richey, Jr., and Gordon R. Winders, Lynchburg, Va., assignors to the United States of America as represented by the United States Atomic Energy Commission
Filed Sept. 29, 1959, Ser. No. 843,322
4 Claims. (Cl. 257—222)

The present invention relates to a heat exchanger, and more particularly to a heat exchanger wherein a hot radioactive fluid exchanges heat with a non-radioactive or non-hazardous fluid.

A nuclear power plant contains, in addition to the fluid and apparatus which are subject to radioactivity, a variety of structure which is not part of the "hot" portion of the power plant but yet may become subject to radioactivity because of close proximity to the hot areas. When maintenance operations are conducted on such a power plant, those portions which become radioactive and thereby hazardous to personnel require special handling with involved special precautions taken to protect the personnel involved. It is therefore convenient and most desirable to assemble the components of the power plant in such a manner that the radioactive portions thereof may conveniently be handled and removed to remote places for handling and maintenance. This is accomplished by making it unnecessary or by minimizing the necessity to cut into radioactive fluid flow lines in order to disassemble the units from the power plant so that they may be removed intact into special areas set aside for the handling of radioactive materials. This procedure minimizes the release of radioactive materials into the "cold" areas of the power plant.

The invention herein described is for a heat exchanger designed for thermal exchange between radioactive and non-radioactive fluids, such as, for example, between the bismuth uranium solution of a liquid metal fuel reactor and the intermediate non-radioactive bismuth which in turn transfers its heat to a steam generator. Such a liquid metal fuel reactor is shown in application Serial No. 90,894, original filed October 14, 1958, in the names of Happell et al., now Patent No. 3,018,239. Briefly described, the invention consists of a specially designed containment with a floating head type tube bundle assembly which extends vertically below a biological shield into the radioactive fluid solution. When it is desired to remove the internals of the heat exchanger for repairs or other maintenance operations, it is only necessary to remove the whole bundle of tubes as an assembly with no cutting into radioactive lines. The assembly of tubes so removed then may be taken to a special area where the maintenance operation may be accomplished without releasing further radioactive fluids into the area. Provision in this heat exchanger is also made, because of the large amount of heat transfer involved, for a temperature compensation arrangement to permit the expansion of the various elements without any possibility of damaging the internals.

It is therefore a first object of this invention to provide a heat exchanger for transferring heat between a hazardous fluid and a fluid which is non-hazardous.

It is a further object of this invention to provide a heat exchanger for radioactive hot fluids in which provision is made for eliminating thermal stress arising between the various heat exchanger elements.

It is still another object to provide an efficient heat exchanger capable of transferring a large amount of energy in a compact, easily maintainable unit.

Other objects and purposes of this invention will hereinafter become more apparent from the following description made with reference to the accompanying drawings in which:

FIGURES 1A and 1B are an assembly view partially cut away in elevation of a preferred embodiment of this invention.

With reference to the drawings, there is shown heat exchanger 10 which is mounted downwardly through a biological shield 12. Heat exchanger 10 consists of an outer cylindrical containment vessel 14, a cylindrical shell 16, and a bayonet-supported tube bundle assembly 18, all having the general cylindrical configuration and concentric to each other as illustrated. Containment vessel 14 and shell 16 terminate at their upper edges thereof in an annular leveling plug 22 which is stepped as illustrated to fit into the biological shield 12. A plurality of bolts and jack screws 24 provide hold-down and leveling during the initial installation of the apparatus.

Tube bundle assembly 18 is supported adjacent its upper portion thereof by a tube bundle removal plug 26, annular in shape, which rests on annular leveling plug 22. Hold-down bolts 28 permit the clamping of assembly 18 to biological shield 12 and its plug 22, while a seal membrane 32, gaskets 34 and 36, and a gas seal 37, placed as illustrated and later described, prevent leakage. Leveling plug 22 is used only during assembly of exchanger 10 and afterwards becomes a part of biological shield 12.

Containment vessel 14 is provided with a nozzle 42 about half-way up its side and another nozzle 44 at its bottom closed end. Other smaller openings 46, 47 and 48, located along the side of vessel 14, are also provided for gas inlets to be later described. Heat exchanger shell 16 is provided with a primary fluid inlet pipe or nozzle 49 passing concentrically through nozzle 42 and an outlet 52 passing through nozzle 44 of containment vessel 14. The primary fluid which enters exchanger 10 through inlet pipe 49 is the radioactive or hazardous fluid which generally is of very high temperature and gives up its heat within heat exchanger 10 to the cooler, non-radioactive or non-hazardous (intermediate) fluid to be used in the generation of steam in another part of the power plant (not illustrated).

Shell 16 is a pressurized vessel which terminates at leveling plug 22, as previously described, and is sealed at the top thereof by tube bundle removal plug 26 and seals 32, 34 and 36. A cylindrical wall or container 58 extends upwardly from plug 26 and is topped by a closure 59.

Tube bundle removal plug 26 supports tube bundle assembly 18 which will now be more particularly described. Assembly 18 comprises a first upper tube sheet 62 and a second (lower) tube sheet 64 which are thick steel circular plates situated in parallel arrangement as illustrated. Lower tube sheet 64 is provided with a semi-hemispherical shell 66 forming a lower intermediate fluid plenum 68 therein. Upper tube sheet 62 is provided with a conduit 72, cylindrical in shape, which expands in a bell-like manner at its lower portion thereof to contact tube sheet 62 and be made integral therewith forming an upper plenum 74 therewith. Conduit 72 extends upwardly and curves outwardly at 72' so that it passes through the side of upper container 58 and so forms the outlet conduit for the intermediate fluid of heat exchanger 10. Passing concentrically within conduit 72 is an intermediate fluid cylindrical conduit 76 which similarly passes through container 58 transversely above conduit 72 and becomes the intermediate fluid inlet. A conduit 82 surrounding tube 76 extends downwardly, passing through upper tube sheet 62 and terminating as it passes through lower tube sheet 64 into lower plenum 68, joining tube 76 at 82' adjacent tube sheet 64. Upper plenum 74 is connected to the interior of lower plenum 68 by a plurality of vertically arranged heat exchange tubes 78 which pass through upper tube sheet 62 and lower tube sheet 64 for this purpose. Flow of the intermediate fluid passes upwardly through tubes 78, as will be later seen. Conduit 82 is surrounded by a spaced concentric tube 83 between sheets 62 and 64 forming an annular chamber connecting plenums 68 and 74. Tubes 76 and 82 form an annular chamber 86 closed at the bottom thereof, as illustrated, and open into the interior of upper container 58 where tube 82 terminates. The bottom of tube 82 extends through lower tube sheet 64 without contacting the latter to permit thermal expansion in this direction.

The construction just described helps to relieve any stress problem arising from differential thermal expansion. It will be seen that pipe 76 is connected only at the vicinity of the lower tube sheet 64 at 82′ to concentric tube 82 which carries the loading to elbow 72′ of outlet tube 72. As a result, tube 82 is free to expand downward and tube 76 is free to expand upward, thereby eliminating any thermal stress arising between these tubes. Also, these tubes are appropriately guided in the lateral direction by the structure illustrated. The loading from tubes 82 and 76 is in turn carried from the reducing elbow 72′ by conduit 72 to top tube sheet 62 where the loading is picked up by a cylindrical skirt 108 and carried to biological shield plug 26 for support.

A cylindrical shroud member 98 is mounted at its uppermost portion to the bottom of tube sheet 62 and extends to the vicinity of lower tube sheet 64. Member 98 has a thin section 98′ adjacent tube sheet 62. Section 98′ is provided with weir openings 104 adjacent upper tube sheet 62. An annular space 102 is formed between shroud 98 and shell 16 which is thickened in this area as illustrated. A ring 106 of convenient design having holes throughout (not shown) is situated below primary fluid inlet nozzle 48 between shroud 98 and shell 16 to permit the selection of the size of the passageways into annular space 102 as a means of adjusting the distribution of flow of the primary fluid through the heat exchanger, if desired.

Skirt 108 is joined at its bottom edge as already noted to the top surface of top tube sheet 62 and is connected at its top end and made rigid with the tube bundle removal plug 26 in order to seal the interior thereof, as previously noted. A dip tube 112 may be mounted within conduit 76, terminating at its bottom adjacent the bottom of lower plenum 68. The purpose of dip tube 112 is to permit the removal by pumping of any collected intermediate fluid within lower plenum 68.

Insulating material 114 may be provided adjacent tube 72 above the high-temperature region, surrounding the outlet and inlet conduits 72 and 76 and surrounding upper container 58. Shielding blocks 116 may be provided to cover the portion of heat exchanger 10 which extends above biological shield 12 as illustrated. Some convenient shielding and bellows apparatus 118 may be provided to permit expansion of and provide sealing for tubes 72 and 76 as they pass through container 58. Induction heating coils 122 may be provided adjacent insulation 114 surrounding tube 72 for heating the apparatus when required. Cooling coils 124 may be provided in the area adjacent the biological shield 12 to eliminate the transfer of heat thereabove.

For pressurizing the interior of tube shell 16 above liquid level 128, gas supply pipes 126′, 126″ and 126‴ are shown passing through containment vessel openings 46, 47 and 48, respectively. The gas supply has two purposes. The first is to help in maintaining the liquid level at 128 just above the point where the primary fluid inlet pipe 48 enters into shell 16. This may be accomplished manually if desired by a differential pressure regulating and liquid level sensing device of common design (not shown) which adjusts gas supply pressure through pipe 126′ in relation to primary pump discharge pressure thereby affecting liquid level control. The second purpose of the gas supply is for sealing purposes. A gas overpressure above that controlling liquid level is maintained through pipes 126″ and 126‴ in the corresponding annular spaces between seals 36 and 37 and between seals 34 and 36. Gas pressure between seals 34 and 36 is maintained slightly higher than between seals 36 and 37 to insure that, if any leakage occurs at the seals, it will be in a downward direction. By having leakage flow downward, gaseous radioactive fission products should not enter the annular gas spaces between seals to endanger personnel when the seal membrane 32 is cut for tube bundle removal. Check valves (not shown) may be provided in pipes 126″ and 126‴ as a safety measure to maintain pressure at the seals in the event of a gas system failure.

Small gas leakage, if any, which passes down through the seals is bled off by means of pipe 126′ to a radioactive gaseous waste disposal system (not shown). A lifting lug 132 permits heat exchanger to be handled during assembly and disassembly operations.

Flow through heat exchanger 10 is as follows:

The primary fluid enters into shell 16 through inlet nozzle 49 and fills up the volume surrounding heat exchange tubes 78, joining plenums 74 and 68. The primary fluid enters into the surrounding spaces through weir openings 104, and some of the primary fluid passes through the annular ring openings in ring 106 and down through annular space 102. The pressure of the gas supplied to tube 126‴ is adjusted to maintain the level of the primary liquid at 128. The primary fluid flows downwardly and exits through outlet 52 as illustrated. The intermediate fluid enters into heat exchanger 10 through tube 76 and descends through tube 76 into lower plenum 68. The intermediate fluid then makes a 180° reversal and passes upwardly through the vertically extending heat exchange tubes 78 and through the annular space formed by conduits 82 and 83. The intermediate fluid then egresses into the upper plenum 74 where it passes upwardly and out through outlet 72.

Semi-contact maintenance on tube bundle 18, which is the most vulnerable part of heat exchanger 10, is accomplished by cutting the intermediate fluid pipes 72 and 76, removing hold-down bolts 28, and cutting the welded seal membrane 32 by contact methods. The contaminated tube bundle 18 itself is remotely lifted by lug 132 into a transfer container (not shown) and carried away for disposal. Replacing bundle 18 is done in reverse order. Shell 16 may be removed by remote maintenance only since the primary piping must be cut. However, this portion should last throughout the life of the system, and shell maintenance should not be needed.

It is thus seen that there has been provided a heat exchanger for use with a radioactive or other hazardous fluid in heat transfer relationship with a non-hazardous fluid. The arrangement shown and described is designed to permit its convenient dis-assembly and removal of the most necessary part to a remote area where it can be conveniently and most safely worked upon. The heat exchanger is also relatively compact, efficient in its ability to accomplish heat transfer, and designed to meet wide range of temperatures without suffering excessive thermal stresses.

While only a preferred embodiment of this invention has been disclosed, it is understood of course that various modifications may be resorted to without departing from the principles of this invention.

We claim:

1. A heat exchanger comprising, in combination, a pressure vessel with an opening in the top thereof for containing hazardous liquid; inlet means and outlet means into said vessel for said hazardous liquid; and tube bundle means extending into said vessel through and closing said opening, said tube bundle means comprising a lower plenum and an upper plenum, a plurality of heat exchange tubes interconnecting said plenums for permitting flow of non-hazardous liquid from said lower plenum to said upper plenum and circulation of hazardous liquid between and around said tubes to permit heat transfer between said liquids, tube bundle inlet means for said non-hazardous liquid passing through said upper plenum and terminating in said lower plenum, tube bundle outlet means for said non-hazardous liquid extending upwardly from said upper plenum surrounding said tube bundle inlet means for a portion of the length of said tube bundle inlet means, and means joining said tube bundle inlet and outlet means together at a location free of restrictive attachment to permit free expansion of said tube bundle inlet and outlet means thereby eliminating thermal stresses in said tube bundle inlet and outlet means.

2. The heat exchanger of claim 1 in which means are provided to pressurize said pressure vessel for maintaining the level of hazardous liquid therein at a preselected value for preventing leakage out of said vessel.

3. The heat exchanger of claim 2 in which the pressurizing means includes means forming a series of sealing spaces between said pressure vessel and said tube bundle means and means for supplying gas under pressure to said spaces separately and in amounts sufficient to insure leakage of said gas into said vessel above said hazardous liquid.

4. The heat exchanger of claim 1 having generally cylindrical shroud means attached to said tube bundle means extending down from said upper plenum and surrounding said heat exchange tubes to bypass a portion of said hazardous liquid from said tubes to regulate thereby the amount of heat transfer occurring between said liquids.

References Cited in the file of this patent

UNITED STATES PATENTS

| 723,850 | Edson | Mar. 31, 1903 |
| 954,668 | Cable et al. | Apr. 12, 1910 |
| 1,884,209 | Potter | Oct. 25, 1932 |
| 1,987,372 | Schellhammer | Jan. 8, 1935 |
| 2,468,903 | Villiger | May 3, 1949 |
| 2,775,470 | Bixler et al. | Dec. 25, 1956 |
| 2,839,276 | Rossi | June 17, 1958 |

FOREIGN PATENTS

| 383,334 | Germany | Oct. 12, 1923 |
| | (Addition to No. 367,087) | |
| 426,731 | Italy | Nov. 6, 1947 |

OTHER REFERENCES

German printed application B 28,814 Ia/17f, Oct. 25, 1956.